C. H. LOW.
Ash Pan.
No. 96,711. Patented Nov. 9, 1869.
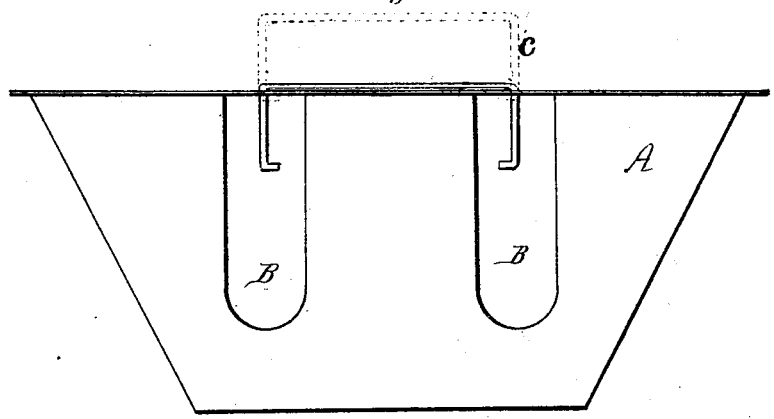
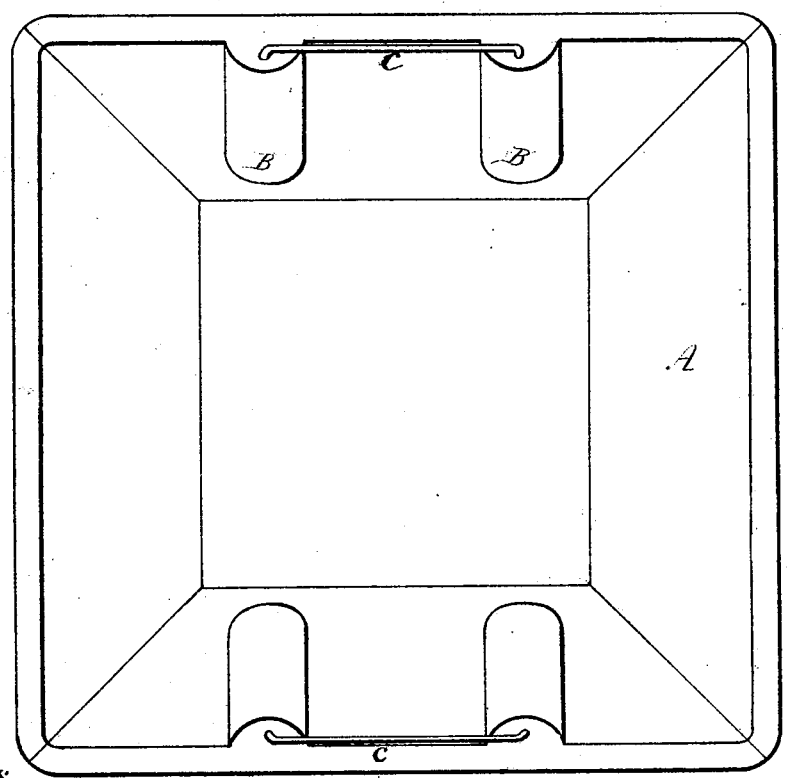

United States Patent Office.

CHARLES H. LOW, OF CLEVELAND, OHIO.

Letters Patent No. 96,711, dated November 9, 1869.

IMPROVEMENT IN ASH-PANS.

The Schedule referred to in these Letters Patent and making part of the same.

*To all whom it may concern:*

Be it known that I, CHARLES H. LOW, of Cleveland, in the county of Cuyahoga, and State of Ohio, have invented certain new and useful Improvements in Ash-Pan Handles for Stoves; and I do hereby declare that the following is a full, clear, and exact description thereof, reference being had to the accompanying drawings, and to the letters of reference marked thereon, which form a part of this specification, in which—

Figure 1 represents a side view of my ash-pan.

Figure 2 is a plan view of the same.

My invention consists of a flaring ash-pan, constructed with projections and movable handles, in the manner set forth.

A represents my ash-pan, formed with flaring sides.

B designates four inside projections, which taper downward, and are made convex on the inner side and concave on the outer side of the pan A.

These projections answer as sheaths for the handles C, which can be pushed down or drawn out, as the occasion may require.

The pan A is to be placed immediately under the grate, so as to receive the ashes as they accumulate, and, by means of the handles C, can be removed with the convenience required.

By placing the handles on opposite sides, the pan will be balanced when it is removed, and all waste of ashes prevented.

Having thus described my invention,

What I claim, and desire to secure by Letters Patent, is—

An ash-pan, constructed with flaring sides, when two opposite sides are furnished with tapering projections B and adjustable handles C, in the manner and for the purpose substantially as described.

In testimony that I claim the foregoing as my own, I affix my signature, in presence of two witnesses.

CHARLES H. LOW.

Witnesses:
    GEO. ARNOLD,
    W. A. FLATT.